United States Patent [19]

Gentric

[11] Patent Number: 4,595,254

[45] Date of Patent: Jun. 17, 1986

[54] OPTICAL FIBER COLLIMATING SYSTEM

[76] Inventor: Alain Gentric, 27 Lotissement de Kéranroux, Ploubezre, 22300 Lannion, France

[21] Appl. No.: 497,211

[22] Filed: May 23, 1983

[30] Foreign Application Priority Data

May 28, 1982 [FR] France .................. 82 09372

[51] Int. Cl.⁴ .......................... G02B 6/36; G02B 6/32
[52] U.S. Cl. .................... 350/96.18; 350/96.15; 350/96.20
[58] Field of Search ............. 350/96.14, 96.15, 96.16, 350/96.18, 96.20

[56] References Cited

U.S. PATENT DOCUMENTS

| | | | |
|---|---|---|---|
| 4,113,346 | 9/1978 | Jackson et al. | 350/96.20 |
| 4,265,511 | 5/1981 | Nicia et al. | 350/96.18 |
| 4,290,667 | 9/1981 | Chown | 350/96.18 |
| 4,327,963 | 5/1982 | Khoe et al. | 350/96.20 |
| 4,447,119 | 5/1984 | Beasley | 350/96.18 |

FOREIGN PATENT DOCUMENTS

| | | | |
|---|---|---|---|
| 2704140 | 8/1978 | Fed. Rep. of Germany | 350/96.20 |
| 2331803 | 11/1975 | France | |
| 1576336 | 10/1980 | France | |
| 2201 | 1/1977 | Japan | 350/96.14 |
| 122134 | 9/1979 | Japan | 350/96.15 |
| 2033104 | 5/1980 | United Kingdom | 350/96.18 |
| 2097149 | 10/1982 | United Kingdom | 350/96.18 |

*Primary Examiner*—William L. Sikes
*Assistant Examiner*—Frank González
*Attorney, Agent, or Firm*—Pearne, Gordon, Sessions, McCoy, Granger & Tilberry

[57] ABSTRACT

A collimator for use with an optical fibre includes a holder for the fibre, the holder having a V-shaped recess at the bottom of which the fibre is held in place. The collimator also includes an optical member able to transform a light beam from the fibre into a parallel beam, the optical member being fixed with respect to the holder. The holder and the optical member are precisely positioned with respect to one another in order to minimize, at a given distance from the optical member, the cross-section of a beam from the fibre which has been transformed by the optical member. The collimator also has a support which can be fitted into the recess so that holder can be adapted to the support, so that it can control the direction of the beam from the fibre which has been transformed by the optical member.

8 Claims, 17 Drawing Figures

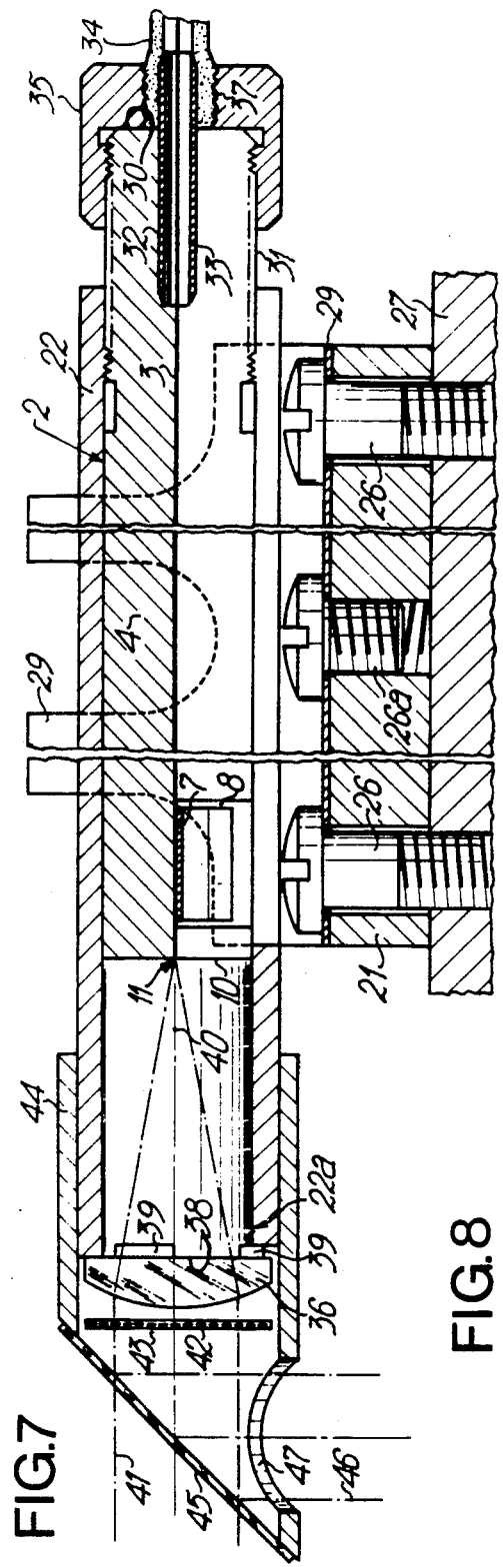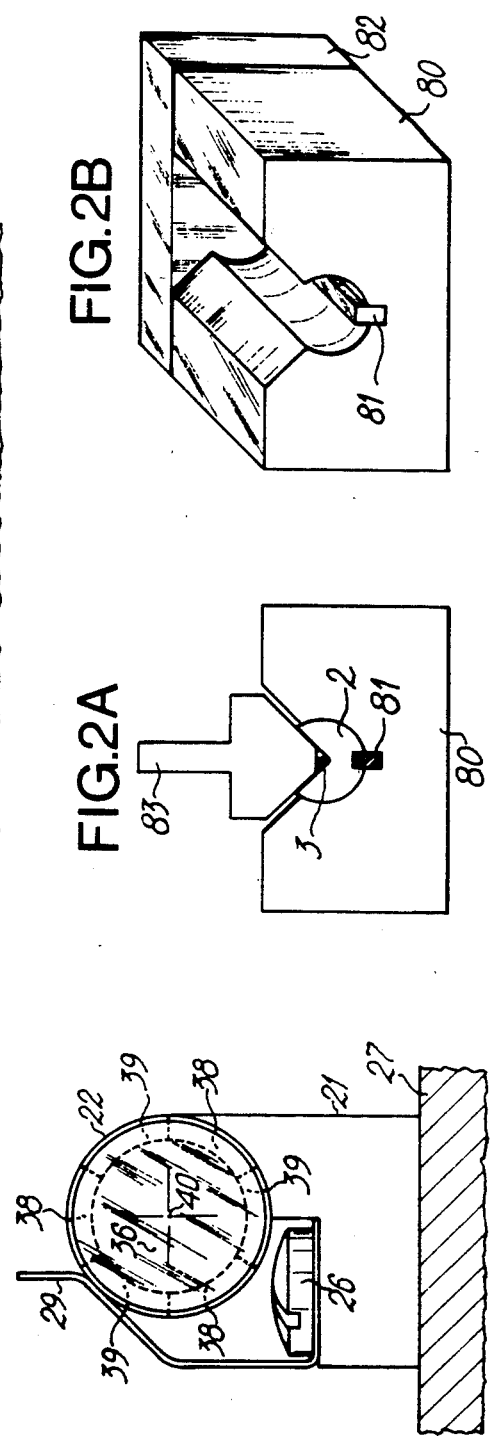

OPTICAL FIBER COLLIMATING SYSTEM

BACKGROUND OF THE INVENTION

The present invention relates to a collimator for an optical fibre. It more particularly applies to the construction of optical switching devices.

Optical switching devices are known, which comprises a matrix of retractable light deflecting members and collimators associated with the rows of said matrix. Each collimator is provided with an optical fibre used for the emission and/or reception of a light beam. The function of the collimators is to control these light beams with respect to their direction and parallelism, in such a way as to be able to inject a maximum of light of any emitting fibre into a receiving fibre.

However, the commercially available collimators, e.g. those comprising devices with microdisplacements have very large dimensions and do not make it possible to produce sufficiently compact optical switching devices, incorporating matrices, whose spacing, i.e. the gaps separating two adjacent optical fibres is sufficiently small, e.g. approximately 10mm.

BRIEF SUMMARY OF THE INVENTION

The present invention aims at obviating this disadvantage.

It therefore relates to a collimator for optical fibre, wherein it comprises:

an optical fibre holding means, which comprises a V-shaped recess, at the bottom of which the optical fibre is held;

an optical means, able to transform a light beam from the optical fibre into a parallel light beam and which can be fixed with respect to the holding means, the holding means and the optical means being previously positioned relative to one another so as to minimize, at a given distance from the optical means, the cross-section of a light beam from the optical fibre and which is transformed by said optical means; and a support which can be fitted into the said recess, so that the holding means can be adapted to this support, so that it can control the direction of the light beam from the optical fibre and which is transformed by the optical means.

For example, the optical fibre is held in the recess with the aid of a platelet bearing on the fibre and adhered to the holding means, or with the aid of an elastic, curved plate, which is joined to the holding means and which bears on the fibre.

The term "support which can be fitted into the recess" is understood to mean a convex support shaped like a V, whose angle of opening is the same as that of the recess. Obviously, the support is not intended to come into contact with the optical fibre, when the holding means rests on said support. Moreover, a fixing means can be provided for maintaining the holding means on said support. It comprises e.g. a spring plate fixed to the support and which bears on the holding means, when the latter rests on the support. The part of the collimator incorporating the holding means, the optical means and the optical fibre is then detachable and can be placed on any support identical to that described hereinbefore.

The collimator according to the invention makes it possible to control the direction of a light beam from the optical fibre and which is transformed by the optical means. Thus, the fixing of the collimator support to a reference plate makes it possible to impose a constant direction on the light beam. This direction remains unchanged after the holding means has been removed and then replaced on said support. The collimator according to the invention also makes it possible to control the parallelism of the beam when it leaves the optical means. Thus, it has been stated that the optical means is able to transform a beam from the optical fibre into a parallel beam, but in actual fact the beam is never strictly parallel and has a slight divergence and the cross-section at one point of this beam increases with the distance of said point from the optical means. Thus, before fixing the optical means with respect to the holding means, the relative position of said means is regulated so as to minimize said cross-section at a given distance from the optical means. Thus, equivalently, the control is carried out in such a way as to inject a maximum of the light of said beam into another optical fibre located at said distance from the optical means and placed in the extension of the beam.

The collimator according to the invention makes it possible to produce compact optical switching devices, provided with a switching matrix having a limited spacing, e.g. a matrix with a spacing of 10 mm, for light beams with a diameter of 5 mm.

According to a special characteristic of the optical fibre collimator according to the invention, said collimator also comprises a sleeve containing the holding means and open so as to render the recess visible, the optical means is fixed to the sleeve and the sleeve is fixed to the holding means once the cross-section has been minimized, the minimum of said sections being determined as a result of displacements of the sleeve relative to the holding means.

According to a special embodiment of this collimator, the holding means, recess and sleeve are rectilinear and oriented in the same axis, the recess opening out onto one end of the holding means, whilst the optical means is a convergent optical device mounted on the sleeve, facing said end and in such a way that the optical axis of said convergent optical device is located in the extension of the axis of the optical fibre maintained in the recess.

The optical device is, for example, a convergent lens. Bearing in mind the sought performances, it can also be a planoconvex lens, an aspherical lens or a convergent achromatic doublet.

According to another special embodiment, the collimator according to the invention also comprises means for sampling part of the light beam from the optical fibre and which is transformed by the optical means. This light beam can carry photons with different wavelengths. "Part" is understood to means a fraction of the total intensity of this beam or photons of one or more wavelengths present in the beam, the collimator then permitting a wavelength demultiplexing. Obviously, this sampling means would then also make it possible to inject light beams of different wavelengths into the optical fibre.

According to another special embodiment, the collimator according to the invention also comprises means for attenuating the light beam from the optical fibre and transformed by the optical means. Obviously, this attenuation means would also make it possible to attenuate a light beam before injecting it into the optical fibre.

According to a preferred embodiment of the collimator according to the invention, said recess is V-shaped with a 90° opening and the support has two orthogonal planar faces, machined at their intersections in such a way that the support cannot come into contact with the optical fibre, when said support is fitted into the recess by means of its two faces.

The optical fibre collimator according to the invention is applicable to the construction of optical switching devices, comprising a matrix with M rows and N columns of retractable light deflecting members and a plurality of such collimators arranged facing the rows and columns of the matrix in such a way that a light beam from a collimator associated with a row of the matrix can reach another collimator associated with a column of the matrix and vice versa, as a result of the light deflection member positioned at the intersection between said row and said column.

According to another special embodiment of these optical switching devices, each row of the matrix is associated with two collimators, which face one another and are separated by the matrix, in such a way that it is possible to produce optical communications between the optical fibres of the collimators associated with the rows of the matrix, said collimators being placed on one side of the matrix, and the optical fibres of the collimators associated with the columns of the matrix, and optical communications between the fibres of the collimators associated with the rows of the matrix and positioned on said side of the matrix and the fibres of the collimators also associated with the rows of the matrix and positioned on the other side of the matrix.

BRIEF DESCRIPTION OF THE DRAWINGS

The invention is described in greater detail hereinafter relative to non-limitative embodiments and with reference to the attached drawings, wherein show:

FIGS. 2a and 2b diagrammatic views of an arrangement provided for the positioning of the fibre in the holding means shown in FIGS. 1 and 2.

FIG. 7 a diagrammatic view of an embodiment of the collimator according to the invention.

FIG. 8 a diagrammatic left-hand view of part of the collimator of FIG. 7.

DETAILED DESCRIPTION OF THE PREFERRED EMBODIMENTS

Figure 1:
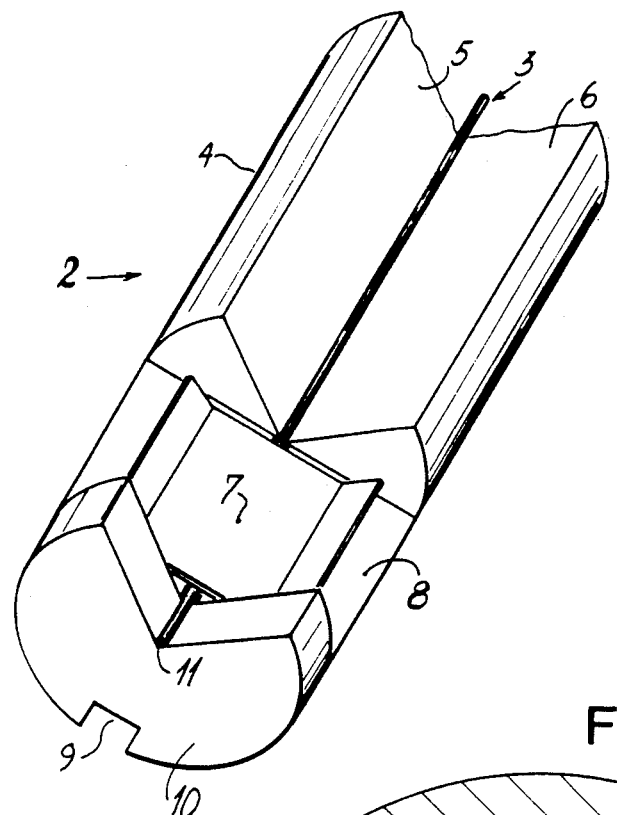
FIG. 1 a diagrammatic perspective view of an embodiment of the optical fibre holding means.

FIG. 1 is a diagrammatic perspective view of a special embodiment of the holding means 2 for optical fibres 3. Holding means 2 comprises an elongated body 4, in the lengthwise direction of which is formed a V-shaped recess with a 90° opening, defined by two orthogonal planes 5 and 6. Optical fibre 3 is held at the bottom of the recess by a platelet 7, bearing on the fibre 3 and is fixed, e.g. by gluing, to a flat 8 formed in body 4 in such a way as to be tangential to fibre 3, when the latter rests on the bottom of said recess. Platelet 7 is raised at its edges, so that it can easily be manipulated. Body 4 has a longitudinal groove 9 used for the guidance in translation and the blocking in rotation of the holding means 2 with respect to its sleeve and as will be shown hereinafter in connection with FIG. 6.

Body 4 has a planar end 10 perpendicular to the two orthogonal planes 5 and 6. End 10 also represents the end of the holding means 2. An arrangement shown in FIGS. 2a and 2b is provided with a non-polluting abutment, i.e. it does not scratch the optical fibre 3 and makes it possible to longitudinally position, as a result of the abutment, end 11 of fibre 3 in the plane of end 10 of body 4. The abutment in question is, for example, made from Teflon. This positioning is obviously effected prior to the immobilization of the fibre by the platelet.

Figure 2:
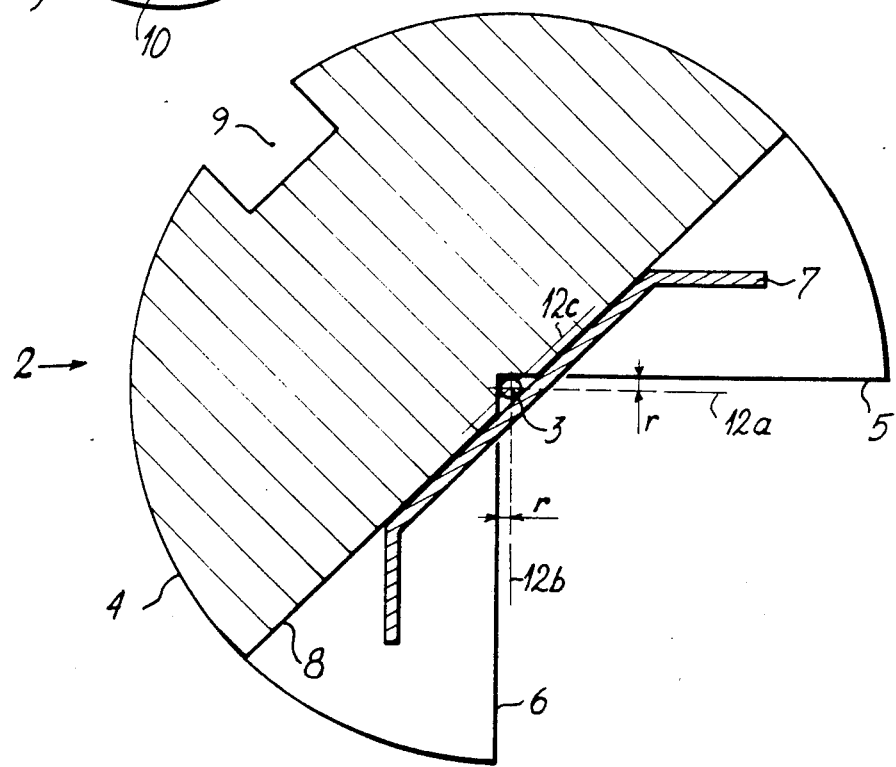
FIG. 2 a sectional view of FIG. 1.

Holding means 2 is more specifically defined in FIG. 2, which shows it in a cross-sectional view at flat 8. Body 4 adopts the shape of a cylinder of revolution, whose axis is defined in FIG. 2 by the intersection of the lines of two orthogonal diametrical planes 12a, 12b and whereof part has been removed to form the said recess. In per se known manner, the two orthogonal planes 5, 6 defining the said recess are produced in such a way that one axis of optical fibre 3 coincides with the axis of the cylinder, when the fibre is engaged with the bottom of the recess. (In the case of a cylindrical fibre of radius r, which is e.g. 62.5 or 100 μm for the presently used multimodal fibres, each of the two orthogonal planes 5, 6 is parallel to one of the aforementioned diametrical planes 12a, 12b and is located at a distance r from said diametrical plane).

The flat 8 is located in the vicinity of end 10 of the holding means and parallel to another diametrical plane 12c, perpendicular to the inner bisecting plane of the V. This flat is positioned opposite to the bottom of the recess with respect to the axis of the cylinder and at a distance from the other diametrical plane equal to the radius r, in such a way that once platelet 7 has been glued to the flat 8, the optical fibre 3 is inscribed in a column, whose cross-section (FIG. 2) is an isosceles right-angled triangle, whose sides correspond to the two orthogonal planes 5, 6 and to the platelet 7. Groove 9 is formed on the periphery of body 4 parallel to the axis of the cylinder and e.g. following the intersection of said periphery and said internal bisecting plane of the V.

The arrangement, diagrammatically shown in FIGS. 2a and 2b, comprises a receptacle 80 having a horizontal cylindrical bore with a 90° opening, provided for the positioning of the holding means 2 of fibre 3 with the aid of a wedge 81. At one end of receptacle 80 is located a not shown two-position push button, which either permits the passage of holding means 2 for fibre 3, or the holding and locking in position of said holding means 2 against the non-polluting abutment 82. A 90° guidance jaw 83, whose angle is chamfered by the value of said right-angled isosceles triangle bounding the fibre, as a result of its own weight ensures that the fibre is positioned at the bottom of the V-shaped recess of holding means 2. When the fibre abuts it is then possible to fix it by means of a platelet 7, coated with glue, said platelet being carried by a not shown moving finger.

It is possible to use another arrangement similar to that described hereinbefore, but which does not have an abutment 82 for positioning fibre 3, the latter projecting beyond end 10 of the holding means (FIG. 1). The fibre is then cut level with the end of the holding means. It is then possible to use a microscope to check the quality of the end of the fibre, obtained by said cutting operation. If necessary, the cutting operation is recommenced, before immobilizing the fibre at the bottom of the V-shaped recess.

Figure 3:
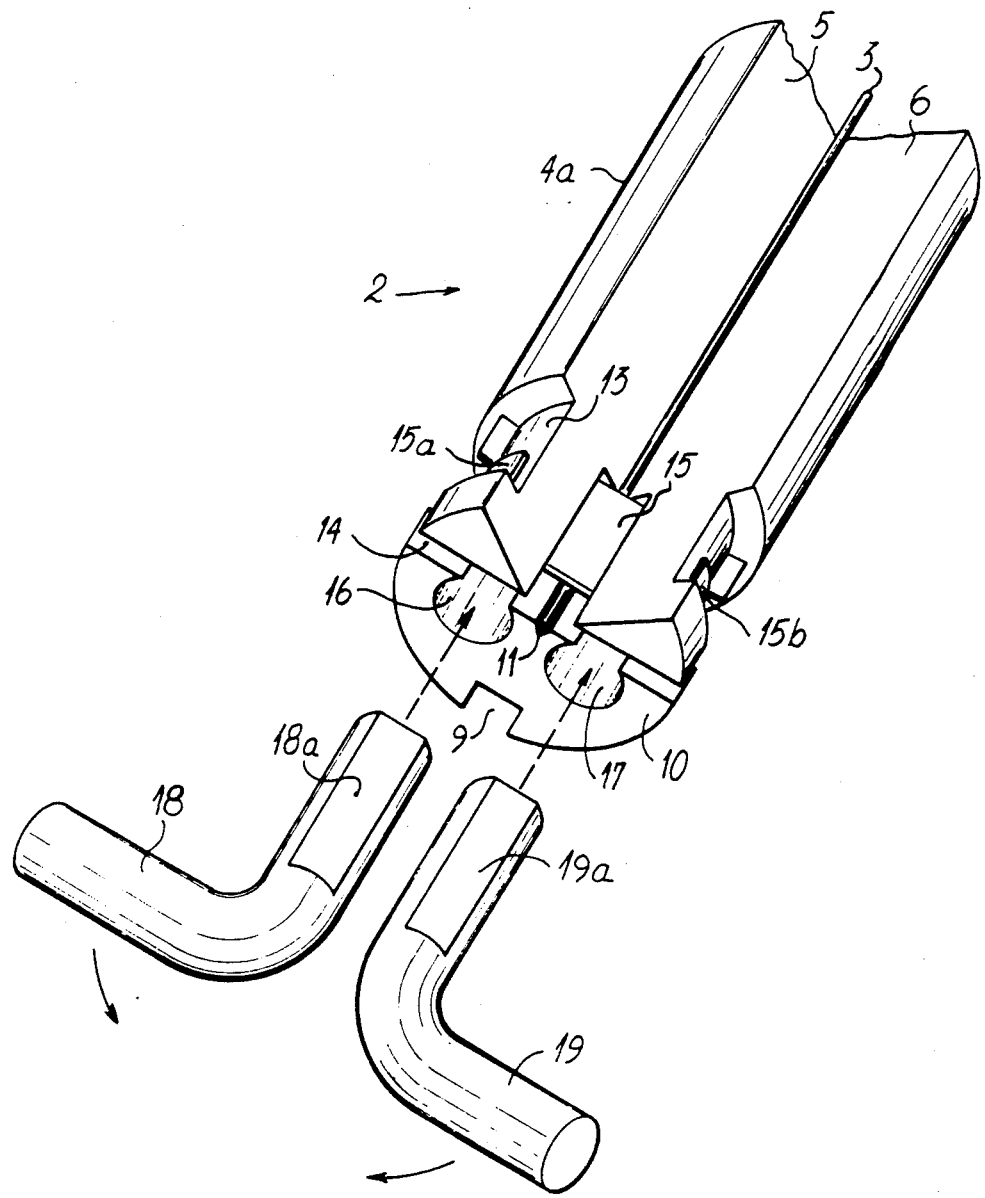
FIG. 3 a diagrammatic perspective view of another special embodiment of the optical fibre holding means, and the keys for positioning said fibre.

FIG. 3 is a diagrammatic perspective view of another special embodiment of holding means 2. It comprises a body 4a, identical to body 4 of FIG. 1, but not provided with the flat 8. The latter is replaced by an annular groove 13 located in the vicinity of the planar end 10 of the body, which is perpendicular to the two orthogonal planes 5, 6 defining the recess. This groove is traversed by a slot 14 issuing into end 10 of body 4a. Slot 14 is made in body 4a, parallel to the other diametrical plane 12c of FIG. 2 and slightly above the bottom of the recess defined by the two orthogonal planes 5, 6, in such a way that by placing a curved elastic strip 15 having a thickness less than that of the slot and whose concavity is turned in the opposite direction to the optical fibre 3 previously placed at the bottom of the recess in the said slot 14, strip 15 bears against the fibre. At its two ends 15a, 15b, strip 15 is bent into annular groove 13 to ensure that it does not escape from slot 14. As a variant, each of the two ends of strip 15 can be slotted into two portions and bent into groove 13 by only one of these portions, as shown in FIG. 3.

In order to be able to manipulate the said strip, two cylindrical recesses 16, 17, which are preferably identical for reasons of simplicity, are made in body 14, starting from the end 10 thereof, parallel to the axis of the cylinder, whose body 4a adopts the shape, on either side of the interior bisecting plane of the V, in that part of body 4a positioned opposite to the recess with respect to the other diametrical plane 12c (FIG. 2) and in such a way that said recesses issue into slot 14.

Figure 4:
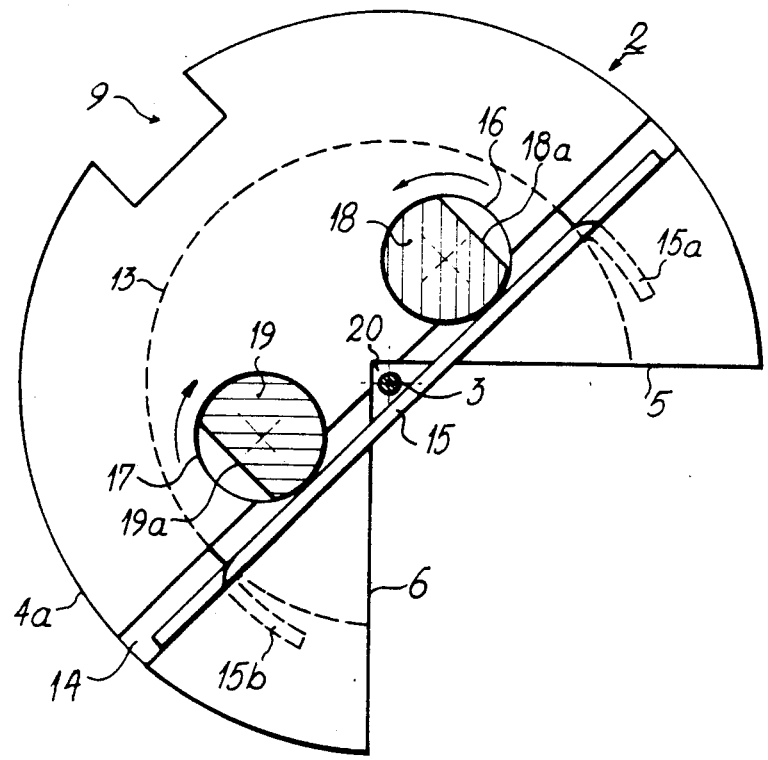
FIG. 4 a sectional view of FIG. 3, showing the keys in a position enabling said fitting to take place.
Figure 5:
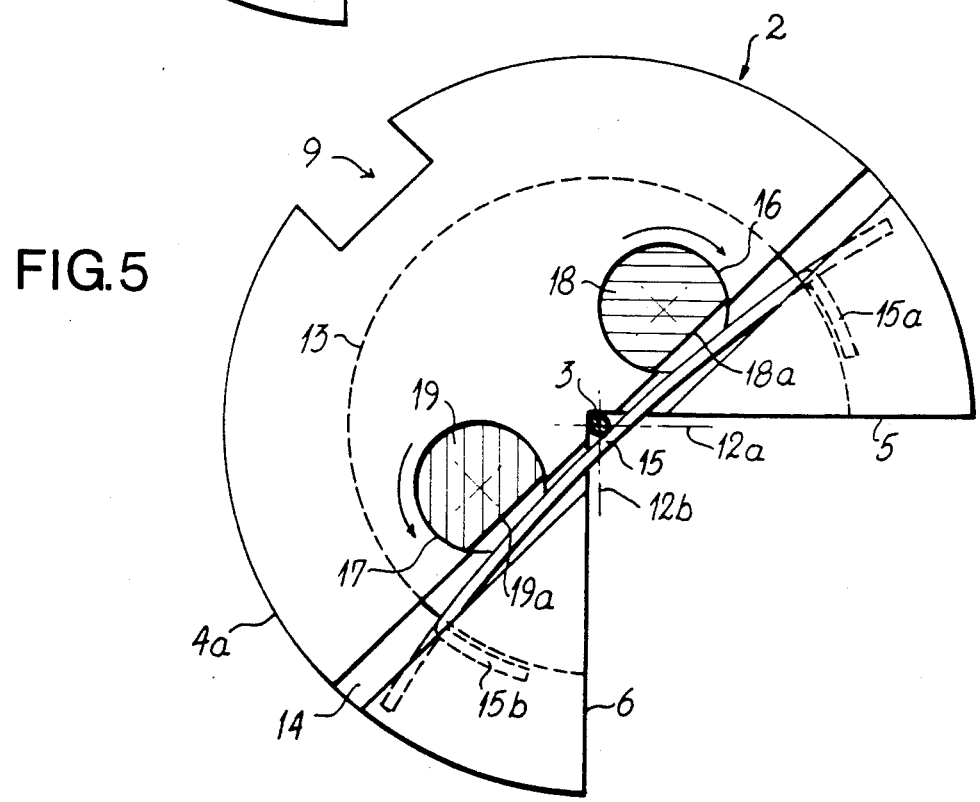
FIG. 5 a sectional view of FIG. 3, once the optical fibre has been immobilized in the holding means.

The immobilization of optical fibre 3 at the bottom of its recess in holding means 2, shown in FIG. 3, is explained relative to FIGS. 4 and 5, which are cross-sectional views of FIG. 3, level with groove 13. Body 4a has been previously placed in a not shown arrangement having two cylindrical keys 18, 19 of the same diameter as recesses 16, 17, which are provided for being introduced and turned in said recesses and are respectively provided for this purpose with flats 18a, 19a. These keys 18, 19 are curved at their end, so as to be easily manipulatable. When strip 15 has been placed in slot 14, keys 18, 19 are respectively introduced into recesses 16, 17, the flats 18a, 19a of said keys being positioned facing slot 14 and parallel thereto. Keys 18, 19 are then simultaneously turned in such a way as to deform, within its elastic limits, strip 15 and to move it away from the bottom 20 of the recess, as can be seen in FIG. 4. Therefore, the optical fibre 3 can easily be slid into the space defined by the two orthogonal planes 5, 6 and by the elastic strip 15. As a result of an abutment (not shown), which does not scratch the fibre, the end 11 thereof is then positioned in the plane of the end 10 of body 4a. Keys 18, 19 are then returned to their initial position, with their flats 18a, 19a again facing slot 14 and parallel thereto. Elastic strip 15 then tends to reassume its shape and engages optical fibre 3 with the bottom of the recess and immobilizes it there, as shown in FIG. 5. Keys 18, 19 are then removed from recesses 16 and 17.

The aforementioned not shown arrangement is comparable to that shown in FIGS. 2a and 2b, but is adapted to the end of holding means 2 of FIG. 3. Therefore, it is provided with two moving keys 18, 19 held in position according to FIGS. 3 and 5 by two springs, thus permitting the introduction of the fibre holding means 2. When the two keys simultaneously perform a quarter turn, this "opens" the triangle formed by the bottom 20 of the V-shaped recess and by the elastic strip 15, providing a passage for the fibre.

The special embodiment of the holding means 2 shown in FIGS. 3 to 5 permits the removal of the optical fibre 3 and its replacement by another optical fibre of the same diameter. However, optical fibre 3 can be definitively immobilized in the bottom of the recess by gluing the elastic strip 15 into slot 14 and this can be carried out by injecting glue into the recesses 16, 17. FIGS. 3 to 5 also show the longitudinal groove 9, positioned in the manner described relative to FIG. 2.

Figure 6:
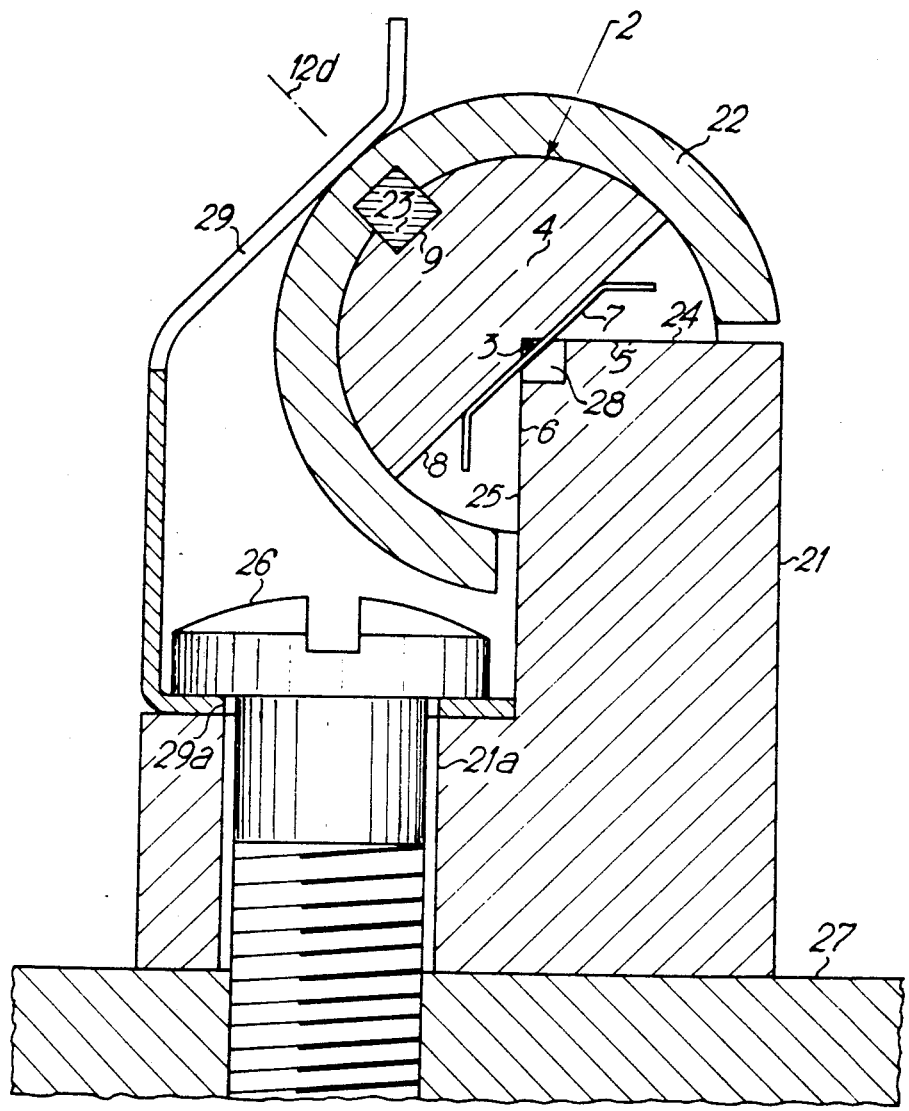
FIG. 6 a diagrammatic view of the holding means of FIG. 1, fitted to the support.

FIG. 6 is a diagrammatic cross-sectional view of the holding means 2 of FIG. 1, placed on a support 21. It would obviously also be possible to use the holding means of FIG. 3. A longitudinal view of the assembly constituted by the holding means and the support is provided in FIG. 7. Holding means 2 is closely enveloped by a sleeve 22 in the form of a tube having an internal diameter equal to that of body 4. This tube has a certain elasticity. In addition, it has a sector slightly larger than 90°, e.g. approximately 100°. Holding means 2 is placed in sleeve 22 in such a way that the V-shaped recess, open by 90° is included in said sector. Moreover, a longitudinal wedge 23 is joined to sleeve 22 and occupies the longitudinal groove 9 of body 4, in such a way as to immobilize holding means 2 in translation. This wedge is positioned along the internal bisecting plane 12d of said sector, said plane coinciding with the internal bisecting plane of the V-shaped recess, when the holding means 2 is disposed in sleeve 22.

For information and in a non-limitative manner, the diameter of body 4 is 6 mm, the thickness of sleeve 22 1 mm and body 4 and sleeve 22 are both made from a metal, or by moulding from a polymer resin.

Support 21 has two orthogonal planar faces 24, 25 and, by means of screws 26, is fixed to a plate 27, which is tapped or threaded for this purpose. The intersection of the two orthogonal planar faces 24, 25 is chamfered by 45°, or machined in such a way that a longitudinal groove 28 appears at its position in support 21, to prevent any contact between platelet 72 and support 21, or between the latter and optical fibre 3, when the holding means 2 is positioned on support 21. The latter takes place by bringing about coincidence between the orthogonal planes 5, 6 defining the recess, and the orthogonal planar faces 24, 25 respectively. The coincidence between the latter and the two orthogonal planes 5, 6 is maintained as a result of an elastic means, such as a spring plate 29, joined to support 21 and bearing on sleeve 22, along the internal bisecting plane 12d of said sector. Spring plate 29 is, for example, maintained on support 21 with the aid of screws 26, which then pass through perforations 29a and 21a, respectively made in spring plate 29 and support 1. Holding means 2 and sleeve 22 form a detachable assembly, which can be separated from support 21, after removing spring plate 29.

FIG. 7 diagrammatically shows a special embodiment of the optical switch according to the invention. It comprises holding means 2 for optical fibre 3, provided with body 4 and placed in sleeve 22, together with support 21 on which the holding means 2 is positioned and held in place as a result of the spring plate 29, as explained relative to FIG. 6 which is a cross-sectional view of FIG. 7, level with flat 8. FIG. 7 shows that the spring plate 29 has an elongated shape and bears onto a large portion of the length of sleeve 22. Spring plate 29 is fixed to support 21 and the latter is fixed to the reference plate 27 by two screws 26. Another screw 26a, positioned between the two screws 26, also maintains the spring plate 29 on support 21, which is threaded for this purpose.

In the embodiment of FIG. 7, reference plate 27 is horizontal. The holding means 2 and optical fibre 3 are also horizontal and the planar faces 24, 25 of support 21 are respectively horizontal and vertical, as shown in FIG. 6.

Sleeve 22 and body 4 have essentially the same length. Optical fibre 3 has one end 11 in the plane of end 10 of body 4. One end 22a of sleeve 22 projects beyond the latter. A convergent lens 36 is fixed to end 22a. The mounting on said lens and its setting will be explained hereinafter. The periphery of body 4 is threaded, e.g. over a third of the length of said body, starting from the other end 30 thereof. Thus, a threaded portion 31 of body 4 in the vicinity of the other end 30 is left exposed by sleeve 22. Body 4 has a bore 32 issuing into said other end 30 and centered on the axis of body 4. An elastic tightening split pin 33 is mounted in bore 32. Once the lens has been set, a protective sheath 34 is mounted by deformation on pin 33. A threaded ring 35 having the same pitch as the thread on portion 31 of body 4 is screwed onto portion 31. In the centre of ring 35 is provided a threaded hole 37, permitting the passage of sheath 34 and the impression of a slight retaining thread on sheath 34, during the screwing of ring 35 onto body 4.

At its end 22a carrying lens 36, sleeve 22 is terminated by three sectors 38, which are at 120° from one another and are separated by three gaps 39. This can easily be seen in FIG. 8, which shows lens 36 from the front. Lens 36 is adhered to sectors 38 following correct positioning thereon with the aid of the control bench and as will be described hereinafter. The three gaps 39 permit the gripping of lens 36 on the control bench. When lens 36 is correctly positioned relative to optical fibre 3, the optical axis of the lens coincides with the fibre axis 40 and a conical light beam emitted by this fibre is then transformed by the lens into a light beam 41, whose axis coincides with that of the fibre and which remains substantially parallel up to a certain distance from said fibre.

In a constructional variant of the collimator according to the invention, a plate 42 for attenuating the light beam 41 from lens 36 is positioned in front of the latter, e.g. perpendicular to its optical axis. (Plate 42 need not be perpendicular to this optical axis). For example, plate 42 is slid into a slot 43 made in a hollow member 44, which can be fitted onto the end 22a of sleeve 22. It is also possible to mount a semitransparent, e.g. glass plate 45 on member 44 and which is inclined by 45° relative to the axis of the beam 41 from the lens, so as to sample part 46 of said beam 41, said part 46 being extracted from the collimator with the aid of an opening 46 made in the hollow member 44. The latter is obviously mounted on the collimator, following the setting and control thereof.

Figure 9:
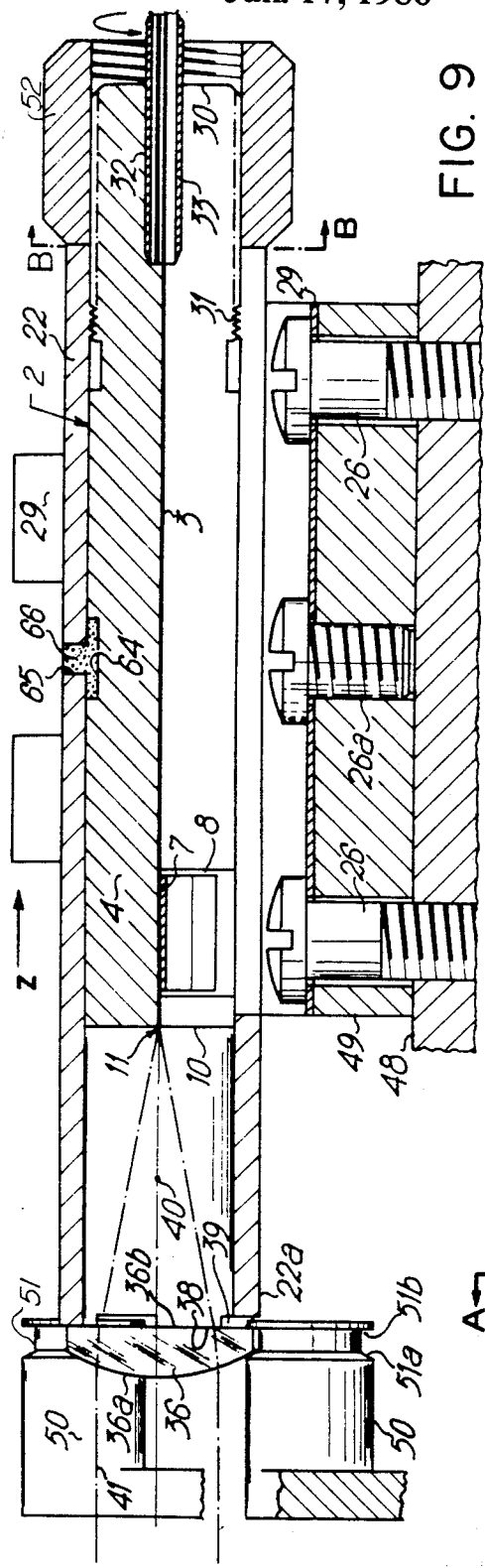
FIG. 9 a diagrammatic view of part of the collimator of FIG. 7, placed on an optical control bench.
Figure 10:
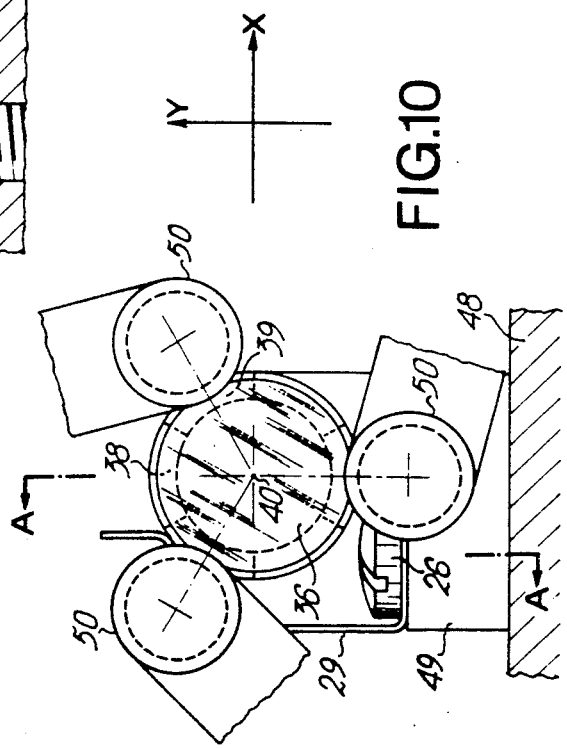
FIG. 10 a diagrammatic view of fingers provided for the positioning of the optical means.

FIG. 9 diagrammatically shows a detachable part of the collimator of FIG. 7, said part incorporating fibre 3, holding means 2, sleeve 22 and lens 36. The holding means for optical fibre 3, placed in sleeve 22, is located in a control bench having a horizontal reference plate 48, on which is mounted a support 49, identical to support 21 of FIG. 7. Holding means 2 is maintained horizontally on said support by a spring plate 29. The end 11 of optical fibre 3 is in the plane of the end 10 of body 4. As has been stated hereinbefore, end 22a of the sleeve projects beyond the end 10 of body 4. The convergent lens is placed vertically against the three sectors 38, spaced by the three gaps 39. It is held in this position by three concentric tightening fingers 50, forming part of a not shown, but known device, which has means for bringing about microdisplacements of all three fingers in two orthogonal axes X and Y belonging to a vertical plane perpendicular to the axis of the fibre and as can be seen in FIG. 10, which is a front view of lens 36. The three fingers 50 are at 120° from one another. Returning to FIG. 9, which is the section AA of FIG. 10, each of the three fingers is provided with a groove 51 serving to receive the lens. In an informative and non-limitative manner, the lens has a cylindrical periphery, as well as a convex face 36a and a planar face 36b, which surround the said periphery and each groove 51 has an inclined wall 51a and a planar wall 51b for respectively maintaining in place convex face 36a and planar face 36b.

In place of the three sectors at 120°, end 22a of the sleeve could also have four sectors forming between them angles of 90°, whereof one would coincide with the said 90° V, said sectors being spaced by four gaps. Use would then be made of a lens gripping device having four fingers at 90° from one another, so as to be able to position the holding means on its support in a direction for which the lens is to the left of the support (case of FIG. 7) and in a direction for which the lens is to the right of the support (position of the lens opposite to that occupied in FIG. 7).

Figure 11:
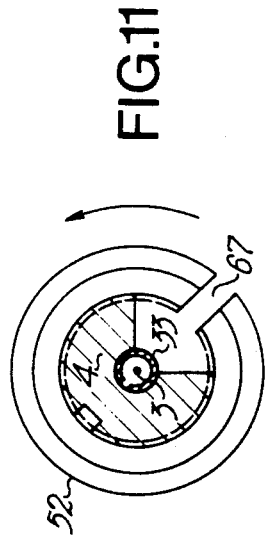
FIG. 11 a sectional view of FIG. ○ showing a button provided for regulating the relative position of the optical means and the holding means.

On the side of the other end 30 of body 4, the elastic tightening split pin 33 has already been fitted, but sheath 34 and ring 35 have not yet been fitted. In place of ring 35, a split threaded button 52 is screwed onto the threaded part 31 of body 4, so as to touch sleeve 22. Button 52 is shown in FIG. 11, which is section BB of FIG. 9. Button 52 is split, because it must be insertable and removable for the setting and control along the hereinafter defined axis Z, the slot of said button overlapping the passage when the optical fibre is in place. (This slot can be wider than the sheath, which permits the fitting of button 52 after fitting sheath 34, with the ring 35 slid slightly rearwards).

Figure 12A:
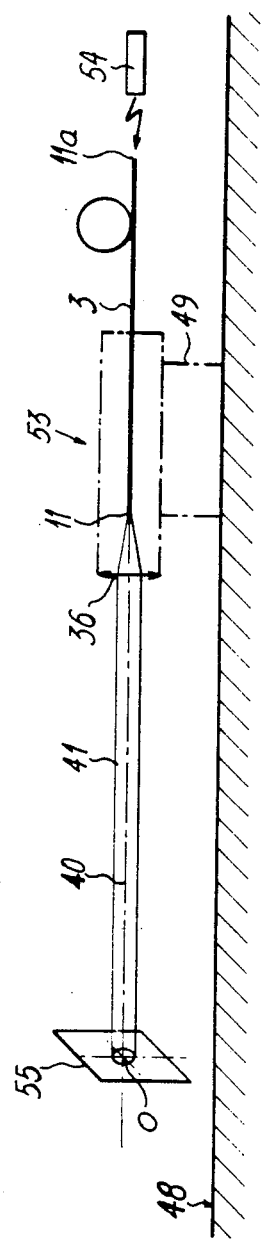
FIGS. 12a and 12b diagrammatic views of the optical control bench.

The setting and regulation of the lens 36 take place in the following way. FIG. 12a diagrammatically shows the detachable part of the collimator of FIG. 7, placed on the control bench by means of support 49, said portion 53 incorporating the fibre, the not shown holding means, the not shown sleeve and the lens. Light from a light source 54 is injected into the fibre at the other end 11a thereof. A sighting mark 55, shown in perspective, is arranged perpendicular to the fibre axis 40 and in such a way that the centre 0 thereof is located on said axis.

By means of microdisplacements of the system of fingers (not shown in FIG. 12a) in accordance with axes X and Y (FIG. 10), it is possible to centre light beam 41 on point 0, which is the centre of sighting mark 55. Lens 36 is then fixed, e.g. by adhesion, to the sleeve sectors 38 (FIG. 10).

Figure 12B:
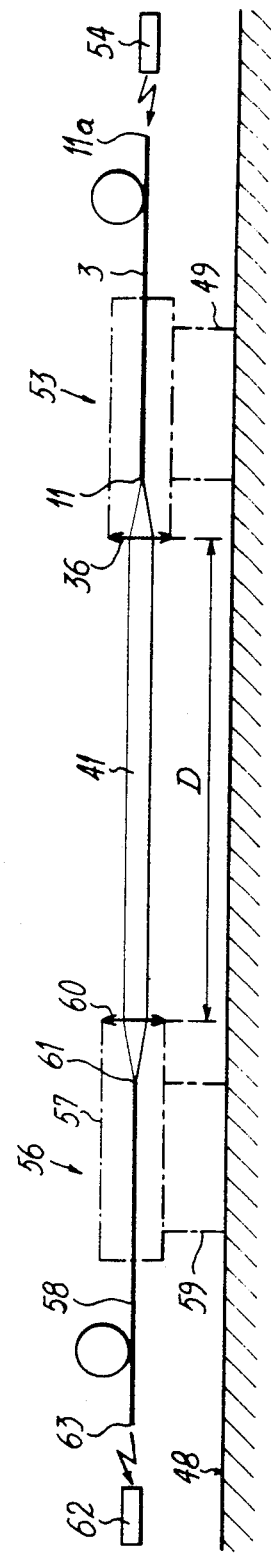

At the given distance D from lens 36, a control collimator 56 is arranged horizontally on reference plate 48, as is diagrammatically shown in FIG. 12b. Collimator 56 comprises e.g. a body 57 having a 90° V-shaped recess, at the bottom of which is held another optical fibre 58 and which rests on a matched support 59, as has been explained relative to FIG. 6. A convergent lens 60 is positioned in front of one end 61 of the other fibre 58, in order to inject there incident light, said light being received by a photodetector 62 placed at the other end 63 of the other fibre 58. Control collimator 56 is disposed on the reference plate 48, in such a way that its lens 60 and lens 36, whose position is to be regulated, are separated by distance D and the axes of the optical fibres 3 and 58 coincide. Thus, at least part of the light beam 41 from lens 36 can be injected into the other optical fibre 58.

With the aid of the threaded button 52 of FIG. 9, it is then possible to displace body 4 relative to sleeve 22, along an axis Z parallel to the axis of optical fibre 3, which brings about a variation in the distance between end 11 of optical fibre 3 and lens 36. This distance is varied until a maximum light intensity is obtained in photodetector 62. (As a function of the direction of the thread pitch of portion 31 of body 4, there is a rotation direction of threaded button 52 making it possible to space body 4 from lens 36, by maintaining button 52 against sleeve 22. It is possible to seek this maximum by starting with an adequately short distance between body 4 and lens 36 and by progressively increasing this distance. On exceeding the distance corresponding to the maximum as a result of an excessively fast rotation of threaded button 52, body 4 and lens 36 are moved together by unscrewing button 52 and then pushing body 4 into sleeve 22. This is followed by the recommencement of the spacing apart of body 4 and lens 36 by turning button 52).

When this maximum has been obtained, sleeve 22 is rendered integral with body 4 (FIG. 8), e.g. by injecting an adhesive resin into a cavity 64 of body 4, via a perforation 65 made in sleeve 22 and which communicates with cavity 64, so as to form, after drying, a rivet 66, immobilizes sleeve 22 relative to the holding means 2. The split, threaded button 52 is then unscrewed and then removed by means of its slot 67, which permits the passage of fibre 3 followed by the fitting of sleeve 34 and ring 35 (FIG. 7). The thus regulated collimator according to the invention is ready to be used. The different phases of the regulation and adjustment explained hereinbefore could be automated.

Figure 13:
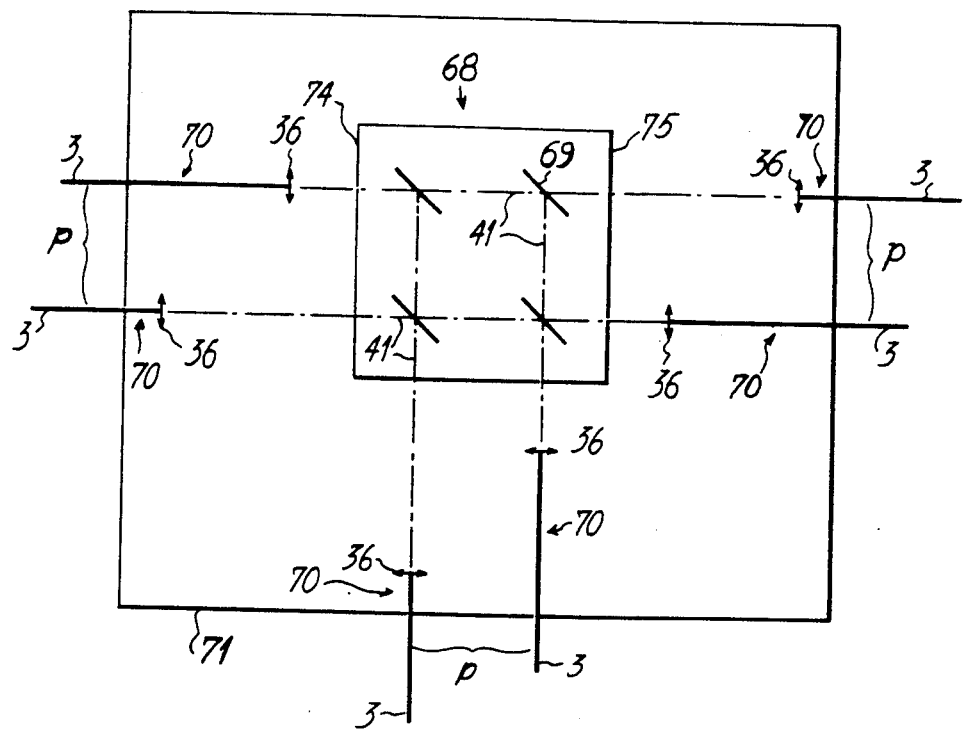
FIG. 13 a diagrammatic plan view of an optical switching device incorporating collimators according to the invention.
Figure 14:
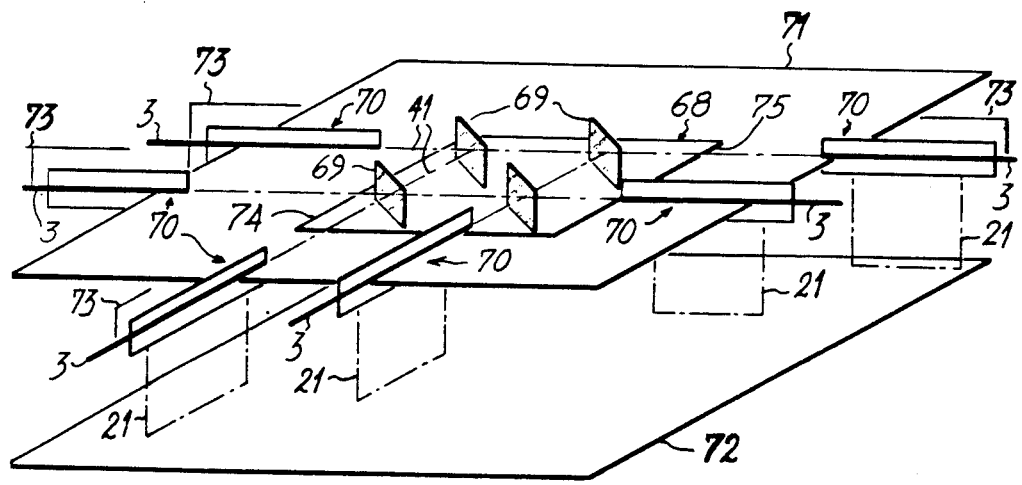
FIG. 14 a diagrammatic perspective view of the optical switching device.

The optical fibre collimator according to the invention is applicable, as has been stated hereinbefore, to the construction of optical switching devices. FIG. 13 is a diagrammatic plan view of an example of such an optical switching device. In FIG. 14, this device is diagrammatically shown in perspective. The optical switching device comprises a matrix 68 having M rows and N columns of retractable light deflecting members 69 and a plurality of collimators 70 according to the invention. In FIGS. 13 and 14, M and N are equal to 2, each of the collimators 70 comprises an optical fibre 3, a lens 36 (FIG. 13) and a support 21 (FIG. 14). The collimators 70 according to the invention make it possible to position each optical fibre 3 at the intersection of a horizontal optical plane 71, defined with respect to a reference plate 72 and parallel thereto, and a vertical plane 73, each intersection defining a row or column of the matrix. When they are not retracted, members 69 are located at the intersections of the rows and columns of the matrix.

The vertical plane 73 associated with the rows of the matrix are parallel and are separated by a distance p, defining the spacing of the matrix. The same applies with regards to the vertical plane 73 associated with the columns of the matrix. The collimators 70 are disposed in such a way that the rows of the matrix are perpendicular to its columns and these collimators obviously rest on plate 72 by their supports 21. Any light beam 41 from optical fibre 3 propagates in the horizontal optical plane 71. Each light deflecting member 69 makes it possible to transmit a light beam from the fibre corresponding to the row of said member onto the fibre corresponding to the column thereof and vice versa. For example, these members correspond to those described in French Patent Application No. 8,102,883 of Feb. 13, 1981. For example, these members are controlled by known electromagnet means, positioned below the members 69 and not shown here. These members could also be controlled by bistable electromagnetic means as described in French Patent Application No. 8,204,198 of Mar. 12, 1982.

Each row of the matrix 68 can be associated with two facing collimators 70, which are separated by the matrix. This makes it possible to use the optical switching device of FIGS. 13 and 14 as a matrix-type optical concentrator - distributor. Thus, it is then possible to establish bidirectional optical communications between the fibres 3 associated with the matrix rows and placed on one side 74 thereof and the fibres 3 associated with the matrix columns. Unidirectional optical communications can be established from fibres 3, also associated with the matrix rows, but placed on the other side 75 thereof, towards the fibres 3 associated with the matrix rows and placed on side 74 thereof. In this case, the light deflecting members are chosen so as to at least partly transmit the light emitted by the fibres located on the other side 75 and obviously to reflect at least part of the light emitted by the fibres located on side 74 and by the fibres associated with the matrix columns, in such a way that a fibre corresponding to a row and placed on said matrix side 74 can simultaneously receive a light beam coming from a fibre associated with a matrix column and the other light beam coming from the fibre facing it on the other side 75 of the matrix. The communications can be managed with the aid of part of the beams from the fibres used for the bidirectional communications and extracted from these fibres by semitransparent plates, in the manner described relative to FIG. 7.

Finally, the collimators 70 corresponding to the rows of the same type of matrix 68 and placed on one side thereof can be regularly displaced relative to one another, in such a way that a light beam linking a collimator to another collimator has a length, starting from the latter, which is independent of the choice of both collimators. More specifically, the ends of the fibres 3 facing the matrix can have a 45° spacing displacement, in such a way that all the beams interconnecting either two fibres separated by the matrix and corresponding to the same row, or one fibre corresponding to a row and another fibre corresponding to a column, have the same length.

What is claimed is:

1. An optical fibre system comprising (A) a collimator for optical fibres, the collimator including an optical fibre having a longitudinal axis;

holding means for said optical fibre, said holding means being elongated and comprising a V-shaped recess which is formed in the lengthwise direction of said holding means and at the bottom of which the optical fibre is held in parallel alignment with said recess, said recess terminating at one end of the holding means;

an optical means which is on one hand able to transform a light beam coming out of the corresponding end of the optical fibre when injected into the other end from a light source, into a substantially parallel light beam, the optical means facing said end with its optical axis parallel to the longitudinal axis of the fibre maintained in the recess, and which is on the other hand fixed with respect to the holding means, the holding means and the optical means being previously positioned relative to one another so as to minimize, at a given distance from the optical means, the cross-section of said light beam from the optical fibre and which is transformed by said optical means; and a support adapted to fit into the said recess, said support having surfaces complementary to the recess for abutment therewith along planes parallel to said lengthwise direction so that the holding means is aligned to this support, thus making it possible to control the direction of the light beam from the optical fibre which is transformed by the optical means.

2. A system according to claim 1, including a sleeve containing the holding means, the holding means, recess and sleeve being of generally constant crosssection and oriented along the same axis, said sleeve having a side open so as to render the recess visible, the optical means being fixed to the sleeve and the sleeve being fixed to the holding means once the cross-section has been minimized, the minimum of said cross-section being determined as a result of displacements of the sleeve relative to the holding means.

3. A system according to claim 2, wherein the optical means is a convergent optical element mounted on the sleeve, facing said end in such a way that the optical axis of said convergent optical element is located in the extension of the axis of the optical fibre maintained in the recess.

4. A system according to claim 1, comprising a means for sampling part of the light beam from the optical fibre and transformed by the optical means.

5. A system according to claim 1, comprising a means for attenuating the light beam from the optical fibre and transformed by the optical means.

6. A system according to claim 1, wherein said recess is V-shaped with a 90° opening and the support has two orthogonal planar faces, machined at their intersections in such a way that the support cannot come into contact with the optical fibre, when said support is fitted into the recess by means of its two faces.

7. A system according to claim one, comprising a matrix with M rows and N columns represented by retractable light deflecting members at the interactions of such rows and columns and a plurality of said collimators arranged facing the rows and columns of the matrix in such a way that a light beam from a collimator associated with a row of the matrix can reach another collimator associated with a column of the matrix and vice versa, as a result of the light deflection member positioned at the intersection between said row and said column.

8. A system according to claim 7, wherein each row of the matrix is associated with two collimators, which face one another from opposite sides of the matrix and are separated by the matrix, in such a way that it is possible to produce optical communications between the optical fibres of the collimators associated with the rows of the matrix, collimators also being placed on a third side of the matrix associated with the columns, in such a way that it is possible to produce optical communications between the fibres of the collimators associated with the rows of the matrix and the fibres of the collimators also associated with the columns of the matrix.

* * * * *